(12) United States Patent
Pellengo Gatti (10) Patent No.: US 10,377,077 B2
(45) Date of Patent: Aug. 13, 2019

(54) MACHINE FOR MANUFACTURING PRE-STRETCHED EXTENDABLE FILM ROLLS

(71) Applicant: NO.EL. S.R.L., San Pietro Mosezzo (IT)

(72) Inventor: Roberto Pellengo Gatti, San Pietro Mosezzo (IT)

(73) Assignee: NO.EL. S.R.L., San Pietro Mosezzo (IT)

( * ) Notice: Subject to any disclaimer, the term of this patent is extended or adjusted under 35 U.S.C. 154(b) by 771 days.

(21) Appl. No.: 14/778,484

(22) PCT Filed: Mar. 28, 2013

(86) PCT No.: PCT/IB2013/052492
§ 371 (c)(1),
(2) Date: Sep. 18, 2015

(87) PCT Pub. No.: WO2014/155157
PCT Pub. Date: Oct. 2, 2014

(65) Prior Publication Data
US 2016/0101562 A1   Apr. 14, 2016

(51) Int. Cl.
*B29C 55/16*   (2006.01)
*B29C 55/00*   (2006.01)
(Continued)

(52) U.S. Cl.
CPC ............ *B29C 55/00* (2013.01); *B29C 55/06* (2013.01); *B65H 23/195* (2013.01);
(Continued)

(58) Field of Classification Search
CPC ................................ B29C 55/06; B29C 55/26
(Continued)

(56) References Cited

U.S. PATENT DOCUMENTS 3,076,232 A    2/1963 Eugene
3,550,826 A *  12/1970 Salmela ................. D01D 5/423
                                                          225/3

(Continued)

OTHER PUBLICATIONS

Search Report and Written Opinion of PCT/IB2013/052492 dated Jan. 17, 2014.

*Primary Examiner* — Joseph S Del Sole
*Assistant Examiner* — Thu Khanh T Nguyen
(74) *Attorney, Agent, or Firm* — Silvia Salvadori, P.C.; Silvia Salvadori (57) ABSTRACT

A machine for manufacturing pre-stretched extendable film rolls provides for a pre-stretch unit (10) of the film (F) and a wrapping unit (100) of the film in roll provided with a series of rolls around which the advancing film is partially wrapped; the pre-stretch unit (10) provides for, in sequence, at least a first pre-stretching roll (12), a pre-stretching auxiliary roll (13) acting against the first roll (12) with the interposition of the film, and a second pre-stretching roll (14) having a speed greater than the speed of the first roll (12) to carry out the pre-stretching of the film; the wrapping unit provides for a wrapping roll (104) for wrapping the pre-stretched film; the pre-stretch unit (10) further provides for a detensioning roll (17) arranged downstream said second pre-stretching roll (14) and having a speed less than said second pre-stretching roll (14) and greater than said wrapping roll (104), so as to obtain a first detensioning of the film after the pre-stretching operation and a second detensioning of the film before the wrapping operation. A high quality pre-stretched film is obtained by this machine.

11 Claims, 8 Drawing Sheets

(51) Int. Cl.
  *B29C 55/06*    (2006.01)
  *B65H 23/195*   (2006.01)
  *B29L 7/00*     (2006.01)

(52) U.S. Cl.
  CPC .... *B65H 23/1955* (2013.01); *B29L 2007/008* (2013.01); *B65H 2301/5124* (2013.01); *B65H 2701/1752* (2013.01)

(58) Field of Classification Search
  USPC ............. 425/335, 336, 363, 367, 404, 461
  See application file for complete search history.

(56) References Cited

U.S. PATENT DOCUMENTS

| | | | |
|---|---|---|---|
| 6,589,463 | B1 | 7/2003 | Vogt et al. |
| 6,713,010 | B1 | 3/2004 | Doran et al. |
| 9,162,403 | B2 * | 10/2015 | Helmy ............... B29C 47/0026 |
| 2002/0017740 | A1 | 2/2002 | Gennesson |
| 2010/0301510 | A1 * | 12/2010 | Coburn .............. B29C 47/0021 |
| | | | 264/45.1 |
| 2011/0095448 | A1 | 4/2011 | Rasmussen |

* cited by examiner

MACHINE FOR MANUFACTURING PRE-STRETCHED EXTENDABLE FILM ROLLS

This application is a U.S. national stage of PCT/IB2013/052492 filed on 28 Mar. 2013, the content of which is incorporated herein by reference in their entirety.

BACKGROUND OF THE INVENTION

The present invention relates to a machine for manufacturing pre-stretched extendable film rolls.

STATE OF THE ART

In order to package industrial, food, and other products, the use is well known of an extendable film, particularly in low density polyethylene, produced in rolls.

It is also known to pre-stretch the extendable film by a special pre-stretch unit before the wrapping operation into a roll. This allows yielding the material so as to stiffen it, so as to obtain a firm packaging of the product. Furthermore, this pre-stretch determines a thickness reduction of the film by length unit, so as to minimize the amount of material to be used for the packaging and so as to simplify or even improve the packaging operations of the product.

In the machines for manufacturing pre-stretched extendable film rolls, the pre-stretch unit is arranged between a sheet film supplying unit and a wrapping unit of the pre-stretched film in the form of a roll.

A known stretching unit provides for, substantially, a first roll that rotates at a low speed, and a second roll that rotates at a high speed; a roll for adjusting the sheet width is interposed between the two rolls, which is suitably spaced apart. The sheet film passes, in sequence through these rolls, being partially wrapped thereabout. The speed difference between the second roll and the first roll determines the pre-stretching of the extendable film. By adjusting the position of the intermediate adjusting roll, it is possible to adjust the sheet transversal shrinkage caused by the pre-stretching action, the so-called "neck-in". Before the wrapping operation into a roll, the pre-stretched film is slightly detensioned by suitably setting the tension of a take up roll and a wrapping roll speed in the proximity of the coil undergoing wrapping.

The sheet film shrinkage leads to problems. In fact, this shrinkage determines an uneven thickness of the sheet film, and particularly a thickening of the film edges is caused, which generates problems upon wrapping the film into a roll. This forces to remove such edges by cutting.

These problems are particularly felt when the sheet film has a considerable width, and when the operative speeds are quite high.

Another problem is to detension the film after the pre-stretching operation. In the known machines, fluctuations of the detensioning values of the pre-stretched film occur, before the wrapping operation into a coil. This involves an imperfect wrapping of the film into a coil and a variability in the mechanical characteristics of the pre-stretched film wrapped into a coil.

Generally, a failed detensioning or a partial and uncontrolled detensioning causes wrapping problems upon packing the coils, with unwrapping problems during use, or also the collapse of the board tube around which the film is wrapped, forcing to use board tubes having a large thickness and a high cost.

OBJECTS OF THE INVENTION

The object of the present invention is to propose a machine for manufacturing pre-stretched extendable film rolls that solves the above-mentioned problems.

A further object of the present invention is that such a machine is structurally and functionally simple, and which allows using very thin board tubes.

BRIEF DESCRIPTION OF THE INVENTION

Such an object is achieved by a machine for manufacturing pre-stretched extendable film rolls in accordance with claim 1, and a process for manufacturing pre-stretched extendable film rolls according to claim 14.

BRIEF DESCRIPTION OF THE DRAWINGS

In order to better understand the invention, a non-limitative implementation example thereof is described herein below, illustrated in the appended drawings, in which.

The FIG. 11 shows a graph that sets forth the behaviour of the extendable film during the processing in the machine of FIG. 1.

DETAILED DESCRIPTION OF THE INVENTION

Figure 1:
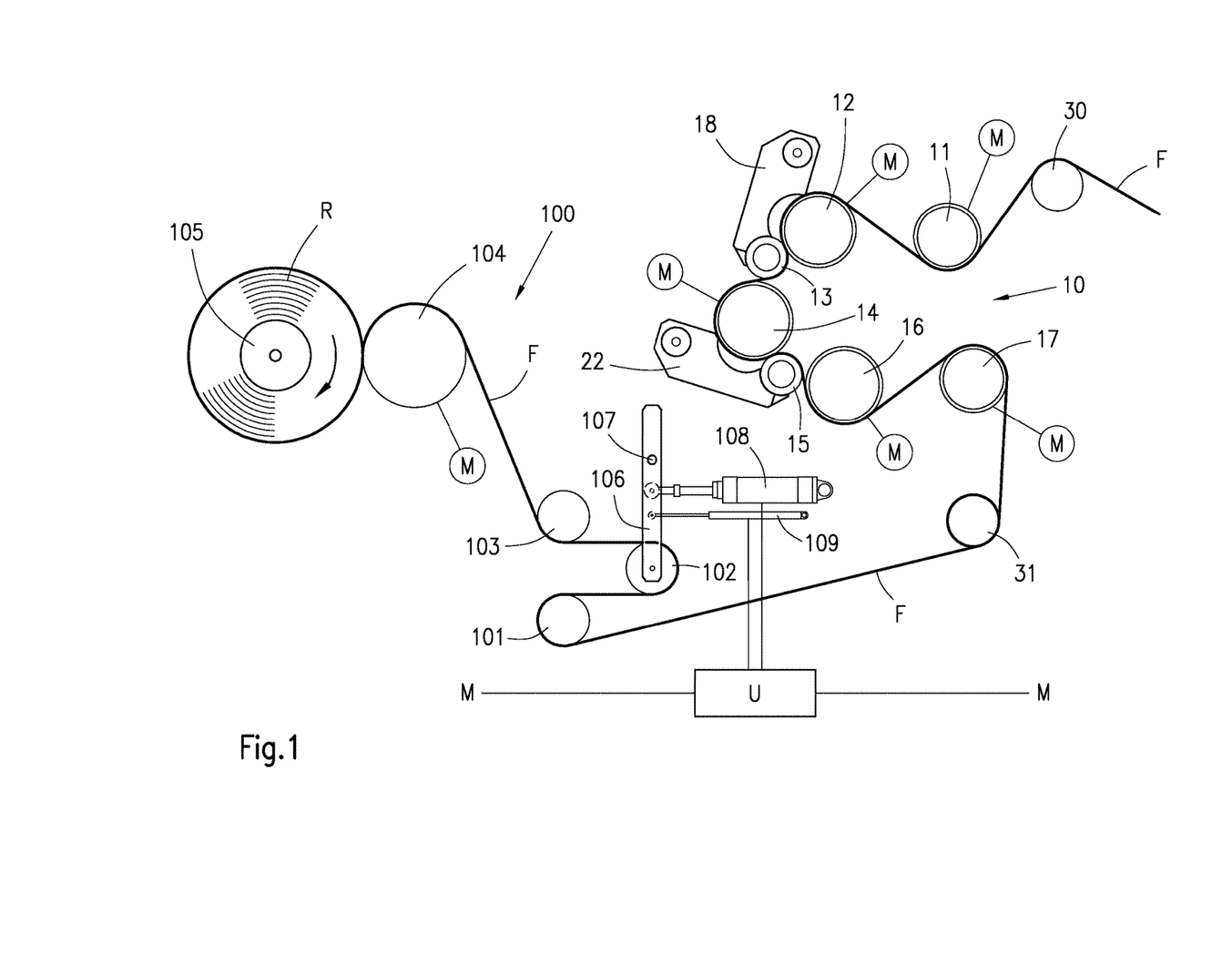
FIG. 1 is a schematic side view of a machine for manufacturing pre-stretched extendable film rolls according to the invention.

The machine for manufacturing pre-stretched extendable film roll's illustrated in FIG. 1 comprises a pre-stretch unit, indicated generally with 10, and a wrapping unit, indicated generally with 100.

Figure 2:
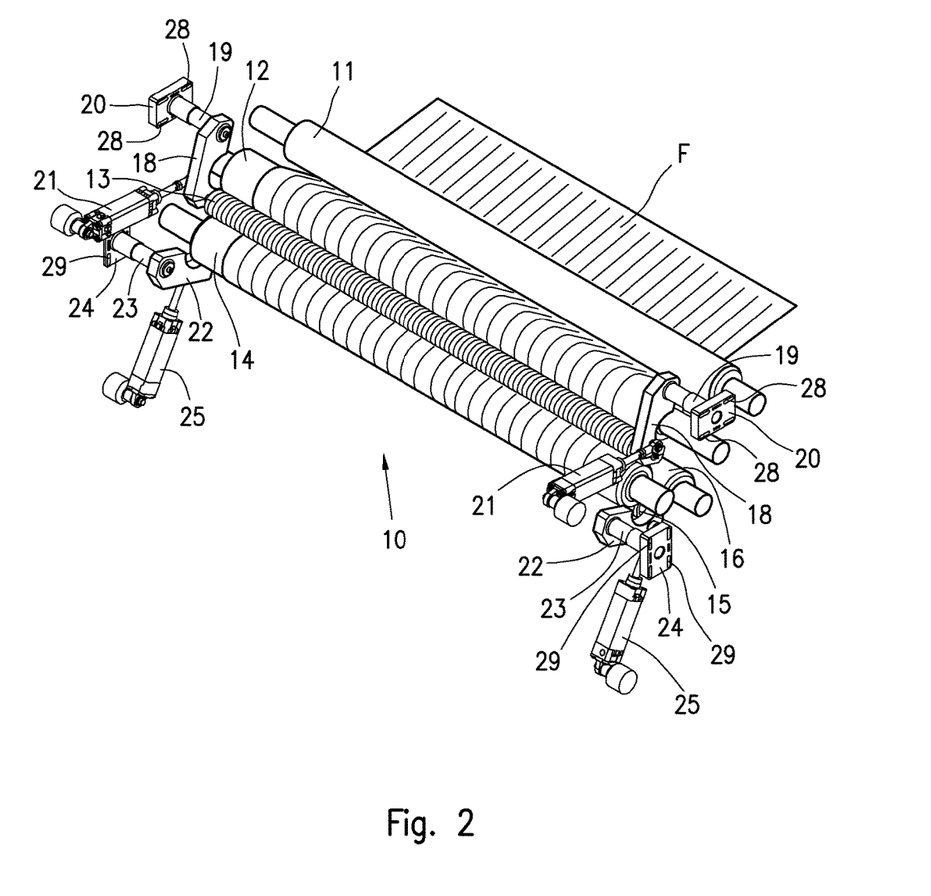
FIG. 2 is a perspective view of a pre-stretch unit of the machine of FIG. 1.
Figure 3:
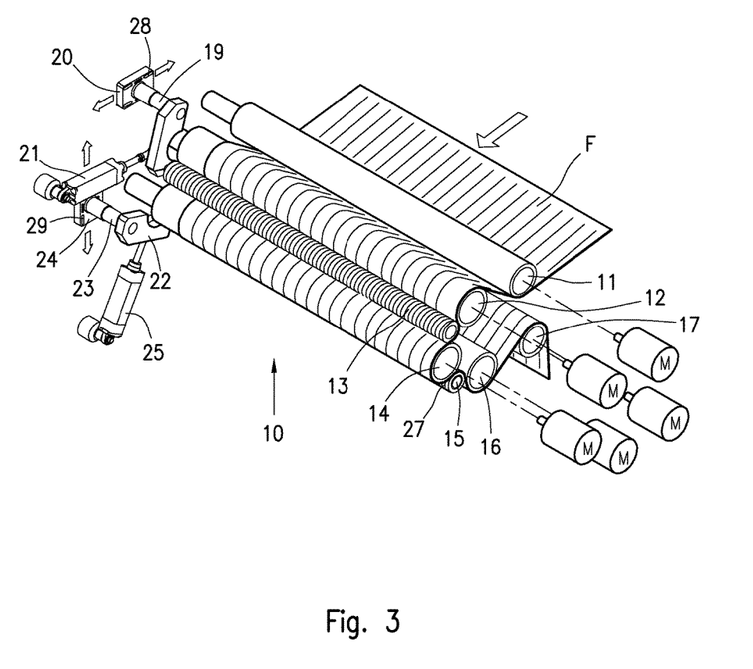
FIG. 3 is a perspective view of the above-mentioned pre-stretch unit with some parts removed.
Figure 4:
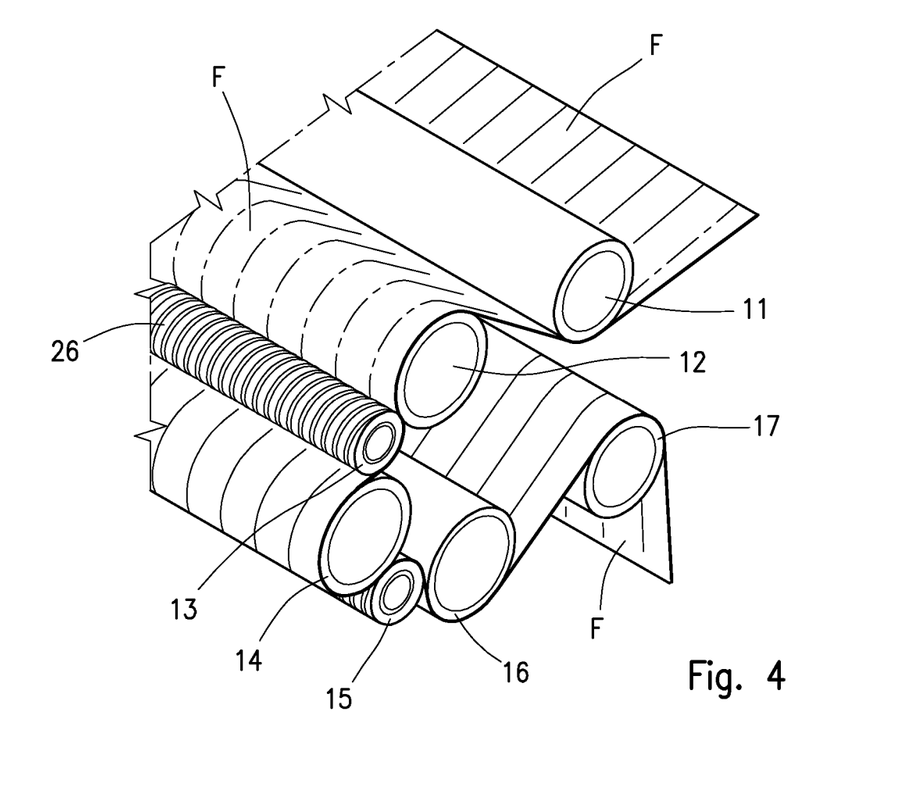
FIG. 4 shows an enlarged detail of FIG. 3.

With reference to the FIGS. 1,2,3, the illustrated pre-stretch unit 10 provides for, in sequence, a pre-tensioning roll 11, a first main pre-stretching roll 12, a first pre-stretching auxiliary roll 13, a second main pre-stretching roll 14, a second pre-stretching auxiliary roll 15, a third main pre-stretching roll 16, and a detensioning roll 17.

The rolls 12,14,16 have preferably an outer cylindrical surface in elastomeric material, while the rolls 13,15 have preferably an outer cylindrical surface in metallic material.

Each of the pre-tensioning and detensioning rolls 11,17 and of the main pre-stretching rolls 12,14,16 is actuated by a respective electric motor. The electric motors are all indicated for the sake of simplicity with the letter M.

The pre-tensioning roll 11 is located in the proximity of the first pre-stretching roll 12. The detensioning roll 17 is located in the proximity of the last pre-stretching roll 16.

The first pre-stretching auxiliary roll 13 is mounted idle on two opposite arms 18 mounted on two respective pins 19 that pivot on two respective adjustable plates 20 integral to the fixed structure of the machine. On each arm 18, a linear motion pneumatic actuator 21 acts, pivoted to the above-mentioned fixed structure.

In the same manner, the second pre-stretching auxiliary roll 15 is mounted idle on two opposite arms 22 mounted on two respective pins 23 that are pivoted on two respective adjustable plates 24 integral to the above-mentioned fixed structure. On each arm 18, linear motion pneumatic actuator 25 acts.

Figure 5:
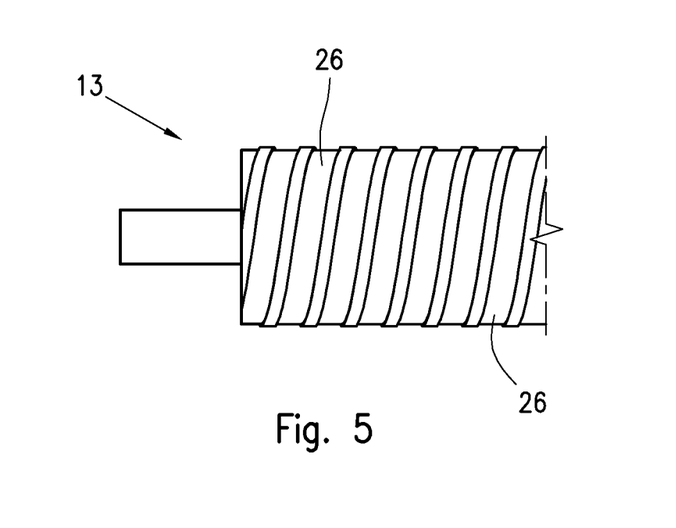
FIG. 5 shows an enlarged detail of a component of the above-mentioned pre-stretch unit.

Furthermore, the first auxiliary roll 13 has a cylindrical surface provided with a coil-shaped continuous groove 26 along the entire surface, as shown in FIG. 5.

In the same manner, the second auxiliary roll 15 has a cylindrical surface provided with a coil-shaped continuous groove 27 along the entire surface.

Figure 6:
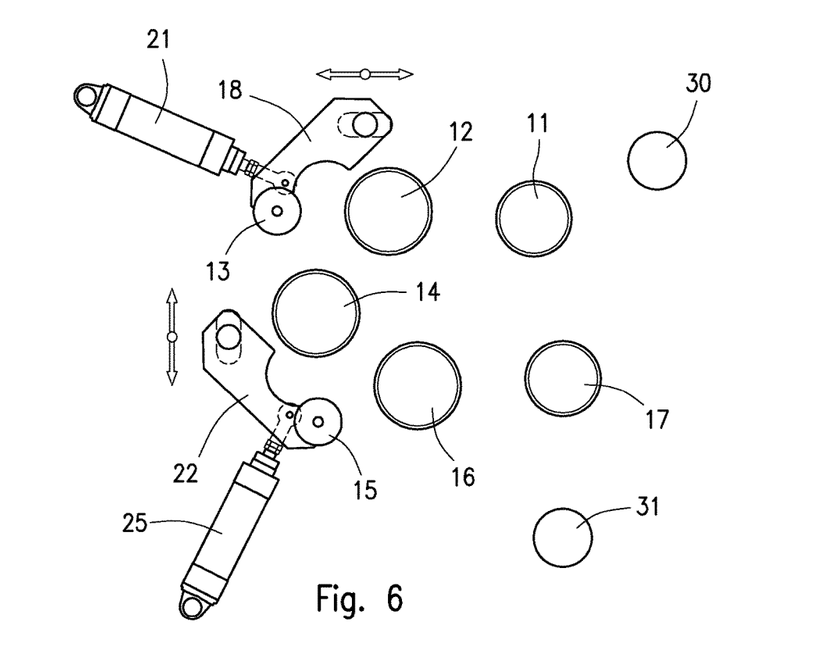
FIG. 6 is a schematic side view of the above-mentioned pre-stretch unit.

In FIG. 6, the pre-stretch unit 10 is shown in a schematic side view. The adjustment of the above-described plates is schematized with a loop slidable on a pin; actually, as shown in FIGS. 2,3, each of the plates 20,24 has four loops 28 and 29, respectively, slidable on not illustrated fixed pins, which allow linear adjustments of the arms 18 and 22. The plates can be then locked in position by suitable securing members, for example, by nuts that can be screwed on the fixed pins.

In FIGS. 1,6, two further outer guide rolls are also illustrated, and precisely an input roll 30 upstream the roll 11 and an output roll 31 downstream the roll 17.

Figure 7:
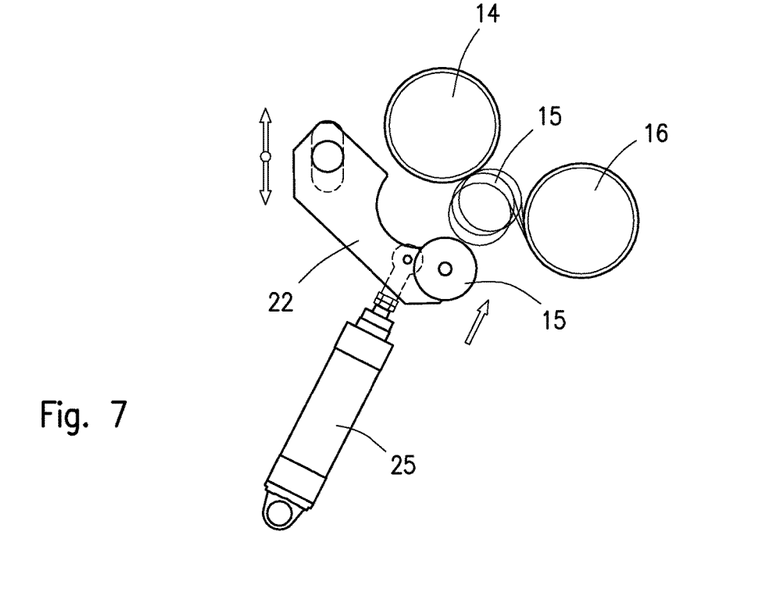
FIG. 7 shows an enlarged detail of FIG. 6.

In FIG. 7, the adjustment of one of the pre-stretching auxiliary rolls is shown in detail, and precisely the roll 15. As it can be noticed, the actuators 25 (only one of which being visible) move the corresponding arms 22 (only one of which being visible) between a moved away position and an operative position in which the auxiliary roll 15 is brought against the pre-stretching roll 14 as shown by the arrow. The adjustment by the special plates allows linearly adjusting the arms 22 as shown by the double arrow, so as to be able to adjust the operative position of the auxiliary roll 15 with respect to the main pre-stretching roll 14 as shown by circles.

The wrapping unit 100, illustrated in FIG. 1, provides for, in sequence, a guide roll 101, a take up roll 102, a further guide roll 103, and a wrapping roll 104 that is in contact with a coil R of the film F being wrapped, which is supported by a reel 105.

The take up roll is mounted on a swinging arm 106 pivoted in 107 at the fixed structure of the machine. The swinging arm 106 is connected to an actuator 108, for example of the pneumatic type, hinged at an end to the arm 106 and at the ether end to the fixed structure of the machine.

The position of the swinging arm 106 is controlled by a position transducer 109, for example, of the potentiometric type, hinged at an end to the arm 106 and at the other end to the fixed structure of the machine.

The wrapping roll 104 is actuated by a motor M.

The machine further comprises a driving and control unit U, connected to all the motors M, to the actuator 108, and to the position transducer 109.

The operation of the described and illustrated machine for manufacturing pre-stretched extendable film rolls is as follows.

It has to be stated beforehand that such a machine can be used for both pre-stretching extendable films coming from pre-packaged rolls (an operation referred to as "off line"), and for pre-stretching extendable films directly coming from an extruder (an operation referred to as "in line").

Figure 8:
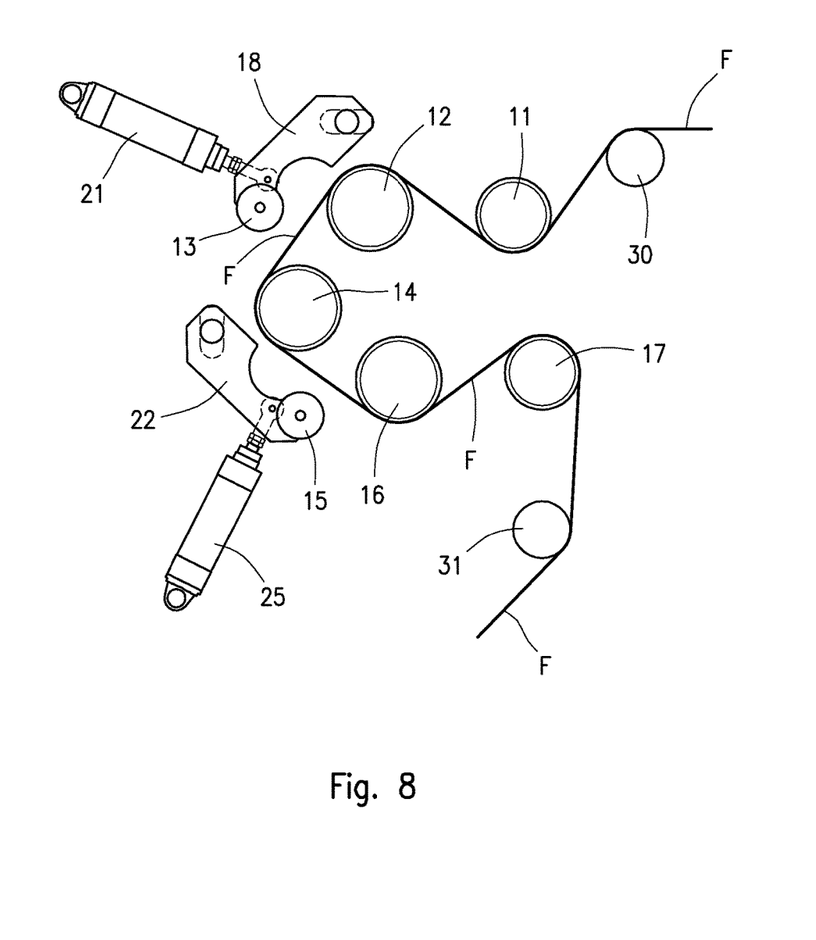
FIG. 8 shows the above-mentioned pre-stretch unit as illustrated in FIG. 6 in a pre-operative position.

There is a manual pre-operative step, in which the sheet extendable film, indicated with F, is passed in the pre-stretch unit 10 through the rolls 30,11,12,14,16,17,31, in the manner illustrated in FIG. 8, being partially wrapped thereabout, then it is passed in the wrapping unit 100 through the rolls 101,102,103,104, being partially wrapped thereabout, and finally it is wrapped on the reel 105.

Figure 9:
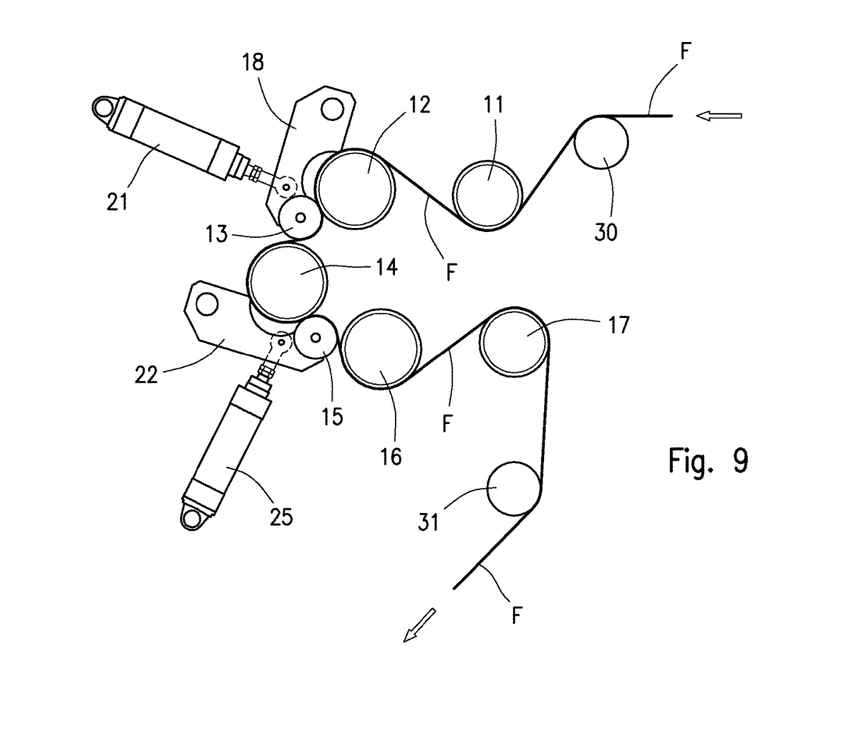
FIG. 9 shows the above-mentioned pre-stretch unit as illustrated in FIG. 6 in an operative position.

In the operative step, as shown in FIG. 9, the auxiliary roll 13 is brought against the roll 12 by the actuator 21 acting on the arm 18, while the auxiliary roll 15 is brought against the roll 14 by the actuator 25 acting on the arm 22. The displacement of the rolls occurs along a trajectory having the shape of an arc of a circle.

Then the motors M are actuated, to carry out the pre-stretching operation.

The speed of the rolls is such that, between the roll 11 and the roll 12, there is a slight pretensioning, between the roll 12 and the roll 14 there is a first pre-stretching, and between the roll 14 and the roll 16 there is a second pre-stretching.

The auxiliary rolls 13 and 15, resting respectively on the rolls 12 and 14 with the interposition of the film F, being idle rotate by being dragged by the motion of such rolls 12,14 actuated by the motors M.

The film F runs through all these rolls being partially wrapped thereabout, as illustrated in FIG. 9, undergoing a determined pre-stretch exactly by the above-mentioned different speeds of the various rolls.

After the second pre-stretch, between the roll 16 and the roll 17, there is a first detensioning, after which the film F is guided from the roll 31 towards the wrapping unit 100.

The path in the wrapping unit provides that the film F is wrapped around the guide roll 101, the take up roll 102, and the last guide roll 103 that guides the film towards the wrapping roll 104.

Such a wrapping roll 104 provides for wrapping the film F around the reel 105, while being in continuous contact with the coil R of film being wrapped.

Figure 11:
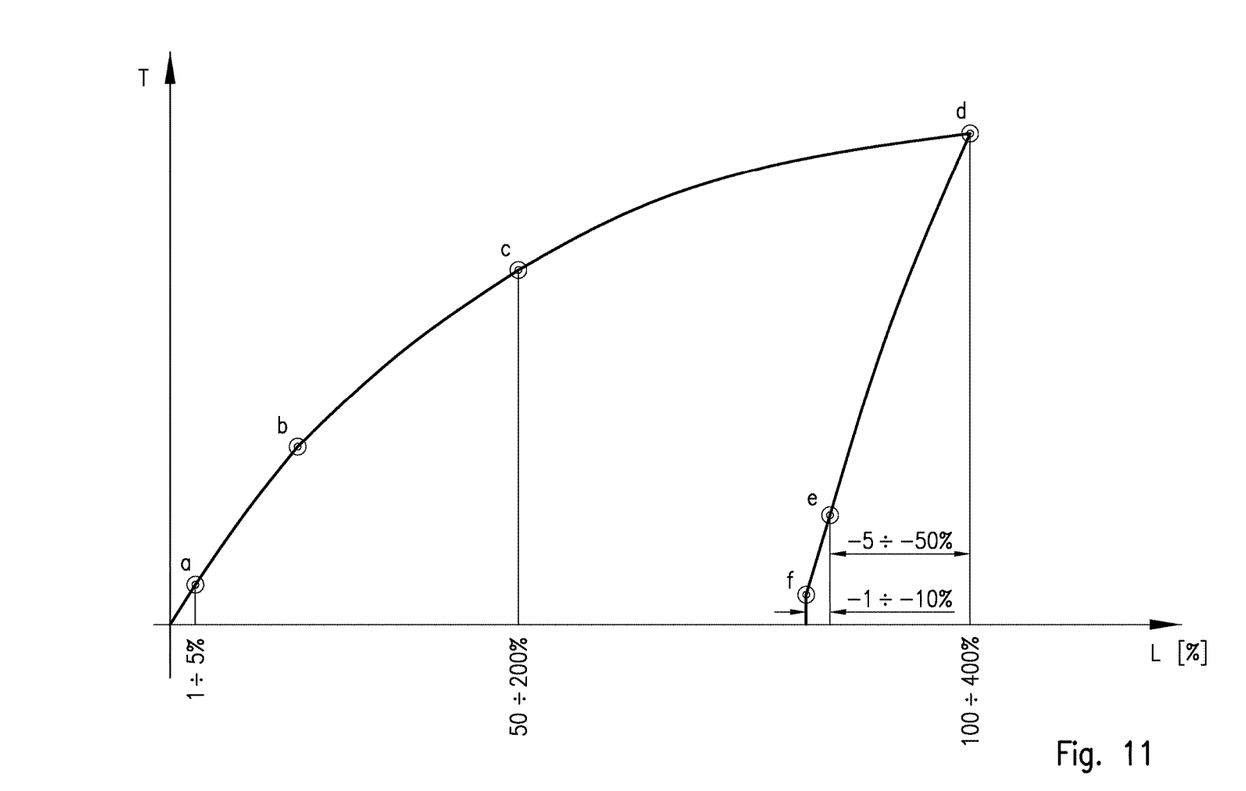

The graph of FIG. 11 illustrates the various pre-stretching and detensioning steps of the film F during the operation of the machine as seen above. The abscissas represent the elongation L percentage of the film, while the ordinates represent the tension T of the film.

From the origin point of the axes to the point "a", corresponding to the passage of the film from the roll 11 to the roll 12, there is the slight pre-tensioning of the film with elongation values that may range between 1% and 5%.

From the point "a" to the point "c", corresponding to the passage of the film from the roll 12 to the roll 14, there is the first pre-stretching of the film with elongation values that may range between 50% and 200%. The point "b" represents the film yielding point, which is passed beyond during this first pre-stretching step.

From the point "c" to the point "d", corresponding to the passage of the film from the roll 14 to the roll 16, there is the second pre-stretching of the film, with elongation values that may range between 100% and 400%.

From the point "d" to the point "e", corresponding to the passage of the film from the roll 16 to the roll 17, there is a first detensioning of the film with shrinkage values that may range between 5% and 50%.

From the point "e" to the point "f", corresponding to the passage of the film from the roll 17 to the roll 104, there is a second detensioning of the film with shrinkage values that may range between 1% and 10%.

The pneumatic actuator 108 opposes to the pulling action of the film on the take up roll 102 acting on the arm 106, so as to keep the film tension constant.

The possible tension variations determine a displacement of the arm 106 that detected by the position transducer 109.

The driving and control unit U provides to drive and control the movements of all the motors M of the various rolls. Furthermore in the case of a tension variation of the film detected by the transducer 109, the unit U provides to vary the speed of the motors M of the rolls 17 and 104 so as to bring the film back to the proper tension value.

The described and illustrated machine has several advantages.

The presence of the auxiliary rolls 13 and 15 that insist respectively on the rolls 12 and 14 prevents an excessive transversal shrinkage of the film F during the pre-stretching operation, promoting a proper grip of the film advancing on the rolls 12 and 14.

Figure 10:
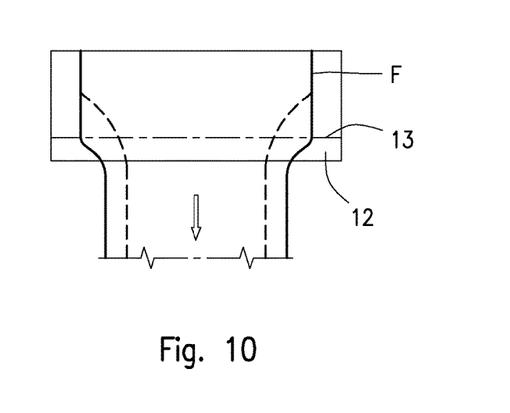
FIG. 10 shows the effect of the pre-stretch unit on the extendable film compared to the prior art.

In FIG. 10, this lesser transversal shrinkage of the film compared to the prior art is schematically shown, with reference to the main roll 12 and the auxiliary roll 13, the presence of which is indicated by a dotted line, which indicates also the contact line of the roll 13 with the roll 12. If the roll 13 would not be present, the film F would undergo the considerably greater shrinkage indicated by the dotted line compared to that indicated by the continuous line.

The feature of having a first detensioning immediately downstream the pre-stretch unit 10 and a second detensioning before the wrapping operation allows avoiding further transversal shrinkages of the film after the pre-stretching operation. Furthermore, such a feature allows finely controlling the film tension before the wrapping operation, thus avoiding excessive tension fluctuations.

The grooves 26 and 27 of the rolls 13 and 15 respectively prevent the formation of air bubbles between rolls and advancing film. This prevents the film shrinkage and allows a correct and precise advancement thereof.

All the advantages set forth above lead to the achievement of a pre-stretched extendable film roll with a high quality.

The illustrated machine is structurally and functionally simple, since it is formed by a few elementary mechanical components.

Furthermore, the controlled detensioning avoids the packing of the coils, and allows using very fine board tubes.

In the case of a film breakage, and of material build-up between the rolls, the fact that the auxiliary rolls can be moved away from the main rolls avoids that the material, by interposing between the rolls themselves, may cause irreversible damages to the rolls or the supports thereof.

The distribution of the pre-stretching actions on five rolls avoids an excessive stress of the film, since it is processed gradually.

It shall be apparent that variations and/or additions to what has been described and illustrated above can be provided.

In a simpler version, only two main pre-stretching rolls and a pre-stretching auxiliary roll acting on the first main pre-stretching roll can be provided. A detensioning roll downstream the second pre-stretching roll will be always present.

The grooves on the pre-stretching auxiliary rolls can have any shape and development along the roll, useful to avoid the formation of air bubbles between film and roll. However, the proposed coil-shaped grooves turn out to be constructively simple and functionally efficient.

Any equivalent means to move the auxiliary rolls may be used, for example hydraulic or electric actuators. Also, a linear movement without arms that are pivoted can be used to bring the auxiliary rolls to insist against the main rolls. However, the system with arms that are pivoted turns out to be simple and efficient.

Also the means for adjusting the position of the auxiliary rolls can be different from the system with plates with loops provided in the example, for example a cam system can be used. However, the system with plates with loops turns out to be also simple and efficient.

Similar considerations can be provided for the wrapping unit. The film tension before the wrapping operation into a coil can be controlled by any film tensioning device associated to any tension detector.

The invention claimed is:

1. A machine for manufacturing pre-stretched extendable film rolls comprising a pre-stretch unit of the film (F) and a wrapping unit of the film into a roll provided with a series of rolls around which the advancing film is partially wrapped, wherein the pre-stretch unit comprises, in sequence, at least a first pre-stretching roll, a pre-stretching auxiliary roll acting against the first pre-stretching roll with the interposition of the film, and a second pre-stretching roll having a speed greater than the speed of the first pre-stretching roll to carry out the film pre-stretching, and wherein the wrapping unit comprises a wrapping roll for wrapping the pre-stretched film, the pre-stretch unit further comprising a detensioning roll arranged downstream said second pre-stretching roll and having a speed less than the speed of said second pre-stretching roll and greater than the speed of said wrapping roll, so as to obtain a first detensioning of the film having a first detensioning value after the pre-stretching operation and a second detensioning of the film having a second detensioning value before the wrapping operation, wherein the auxiliary roll is rotatably mounted at its ends on two arms that are pivoted at a fixed part of the machine, and actuating means are provided, so as to move said arms and consequently the auxiliary roll, between a position of the roll against the pre-stretching roll and a moved away position according to an arc-of-a-circle-shaped trajectory, and wherein means are provided, for adjusting the above-mentioned position of the auxiliary roll against the pre-stretching roll.

2. The machine according to claim 1, further comprising a third pre-stretching roll, having a speed greater than the speed of the second pre-stretching roll to carry out a second pre-stretching, and a further pre-stretching auxiliary roll that is arranged between the second pre-stretching roll and the third pre-stretching roll and acts against the second pre-stretching roll with the interposition of the film, said detensioning roll being arranged downstream said third pre-stretching roll.

3. The machine according to claim 1, wherein the first detensioning value is greater than the second detensioning value.

4. The machine according to claim 3, wherein the first detensioning value is about five folds greater than second detensioning value.

5. The machine according to claim 2, wherein in the passage of the film from the first pre-stretching roll to the second pre-stretching roll there is a first pre-stretching of the film with elongation values ranging between 50% and 200%, in the passage of the film from the second pre-stretching roll to the third pre-stretching roll there is a second pre-stretching of the film with elongation values ranging between 100% and 400%, in the passage of the film from the third pre-stretching roll to the detensioning roll there is a first detensioning of the film with shrinkage values ranging between 5% and 50%, in the passage of the film from the detensioning roll to the wrapping roll there is a second detensioning of the film with shrinkage values that may range between 1% and 10%.

6. The machine according to claim 1, wherein between the detensioning roll and the wrapping roll there is a film tension control device associated to a film tension detector.

7. The machine according to claim 6, wherein a driving and control unit (U) is provided, connected to motors (M) of the above-mentioned rolls, to said film tensioning device and to said film tension detector, to drive and control the above-mentioned pre-stretching and detensioning of the film and to control the film tension before the wrapping operation.

8. The machine according to claim 2, wherein the auxiliary roll is mounted idle, and rotates by being dragged by the roll against which it acts.

9. The machine according to claim 2, wherein the auxiliary roll has an outer cylindrical surface provided with one or more grooves.

10. The machine according to claim 9, wherein the outer cylindrical surface of the auxiliary roll is provided with a coil-shaped groove.

11. The machine according to claim 2, wherein the pre-stretching roll has an outer cylindrical surface in elastomeric material and the auxiliary roll has an outer cylindrical surface in metallic material.

* * * * *